June 18, 1935.　　　　E. L. MAYO　　　　2,005,193
TEMPERATURE RESPONSIVE LIQUID PUMP
Filed March 21, 1934
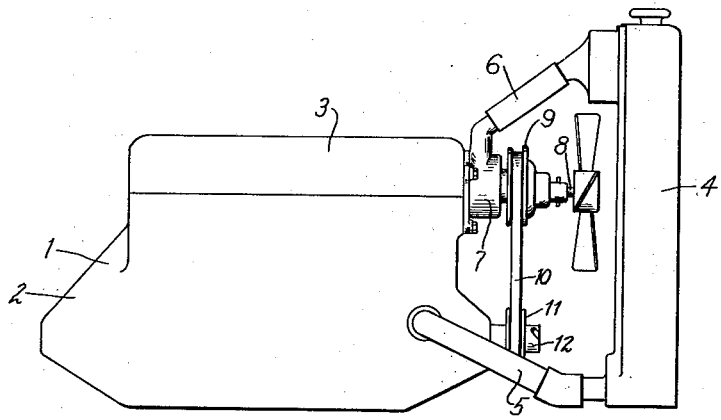
Fig. 1.
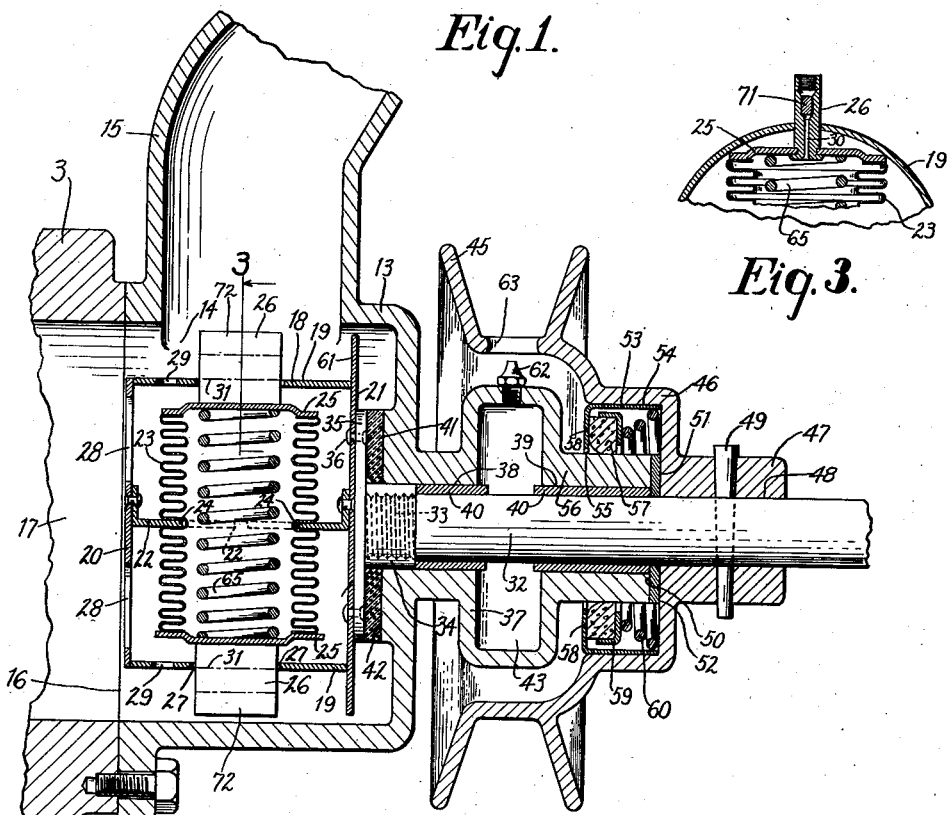
Fig. 3.
Fig. 2.
INVENTOR.
Edward L. Mayo.
BY
ATTORNEY.

Patented June 18, 1935

2,005,193

UNITED STATES PATENT OFFICE 2,005,193

TEMPERATURE RESPONSIVE LIQUID PUMP

Edward L. Mayo, Cleveland, Ohio, assignor to The Bishop & Babcock Mfg. Company, Cleveland, Ohio, a corporation of Ohio Application March 21, 1934, Serial No. 716,657

12 Claims. (Cl. 103—97)

This invention relates to improvements in liquid pumps for circulating cooling liquid through the cooling systems of internal combustion engines.

It has commonly been the practice in connection with internal combustion engines, particularly engines of automobiles, to circulate a cooling medium such as water through a circulatory system by means of an engine-driven pump and to control the rate of flow by a valve device or devices responsive to changes of temperature of the water.

Such thermally responsive or thermostatically operated valve devices are suitably disposed in the circulatory system to throttle the liquid flow or to divert it into a by-pass or branch conduit of the system and function to reduce or substantially prevent circulation of the liquid during the period that the engine is warming up and thereafter regulate the rate of flow through the system in accordance with the engine temperature, permitting maximum rate of flow to occur only when the engine temperature and therefore that of the circulating liquid has risen to a predetermined value.

In such systems, it is customary to drive the pump at a speed proportional to the engine speed and thus it follows that any restriction to the flow of liquid by a throttling valve device imposes useless load on the pump; and in any case, such systems entail the cost of the thermally responsive or thermostatic valve devices supplementing the pump.

It is therefore an object of the present invention to provide a pump which may be driven by an engine at speed proportional to the engine speed for circulating cooling medium such as water through the cooling system of the engine and having means responsive to temperature changes of the liquid to render the above effective only at liquid temperature above a predetermined minimum.

Another object is to provide a liquid pump of the vaned rotor type having means responsive to temperature changes of the liquid being pumped to vary the vane pumping area to effect variation of the pumping action in accordance with changes of liquid temperature.

Another object is to provide a pump for circulating liquid through the cooling system of an internal combustion engine adapted to be continuously driven by the engine at speeds proportional to engine speed and provided with means thermally responsive to the temperature of the liquid being pumped to gradually change the pumping action in accordance with the temperature, to render it wholly ineffective at a predetermined low temperature, and to provide the maximum pumping action at a predetermined high temperature.

Other objects will be apparent to those skilled in the art to which my invention appertains.

My invention is fully disclosed in the following description taken in connection with the accompanying drawing, in which:—

Fig. 1 is a side elevational view of an internal combustion engine and cooling system illustrating an embodiment of my invention applied thereto;

Fig. 2 is a sectional view to an enlarged scale of a part of the apparatus of Fig. 1;

Fig. 3 is a fragmentary sectional view taken from the plane 3—3 of Fig. 2.

Referring to the drawing, I have illustrated generally at 1 an internal combustion engine comprising a base 2 and a head 3. Internally the base may have the well known water jacket having water passages communicating with water passages in the head 3. A radiator 4 communicates by a conduit 5 with the water jacket in the engine base 2 at a relatively low point therein and by a conduit 6 communicates with the water jacket at an upper portion thereof as for example in the head 2. A pump, shown generally at 7, is disposed in the circulating line between the conduit 6 and the water jacket and is driven by a shaft 8 through the instrumentality of a pulley 9 on the shaft, a belt 10 on the pulley 9 and on a driving pulley 11 on the shaft 12 driven in a well known manner from the crank shaft of the engine.

The pump 7, which will be more fully described hereinafter, is continuously driven in the manner described above, but at temperatures of liquid below a predetermined minimum in the circulating system described, the pump exerts no pumping action. This allows the engine to quickly warm up after starting by allowing the heat thereof to accumulate in the water in the engine jacket. The heat of the water, however, is communicated to the pump and when it reaches a predetermined value, the constantly driven pump begins to exert pumping action and the pumping action increases, as the temperature rises, until it is at the maximum when the predetermined maximum temperature has been reached. The pump construction by which this is accomplished will now be described.

A pump housing 13 is formed with a pump chamber 14 provided with an outlet conduit portion 15 adapted to be connected with the circulation conduit 6 and provided with a peripherally flanged inlet opening 16 adapted to be connected to the head 3 of the engine in communication with the water jacket portion 17 thereof.

A pump rotor, shown generally at 18, is provided, mounted upon a shaft 32 to be described, so as to rotate in the chamber 14. The rotor 18 is made generally from sheet metal and comprises a preferably cylindrical wall 19 having circular heads 20 and 21 at the opposite ends thereof. A bracket 22 extends axially through the rotor, being connected to the opposite heads 20 and 21 generally centrally thereof. A bellows 23, preferably of the generally cylindrical metal tubular type having a corrugated wall, extends diametrically across the rotor internally thereof, and the bracket 22 is engaged with the bellows 23 and supports it at a middle portion thereof by inner portions 24—24 of the bracket entering circular concave corrugation portions of the bellows.

Thus the bellows extends in opposite directions from the bracket 22 and at its opposite ends is sealed, for example by soldering, upon peripheral portions of circular heads 25—25. Each of the heads 25 is provided with a pump vane 26 extending outwardly therefrom in the general direction of the axis of the cylindrical bellows 23, and through suitable perforations 27—27 in the cylindrical rotor wall 19. The end wall or head 20 of the rotor is provided with a plurality of relatively large perforations 28—28. The cylindrical wall 19 may be provided with a plurality of relatively small perforations 29—29. The thermostatic bellows 23 has therein a suitable quantity of thermally expansible liquid or vapor such as commonly employed in thermostats of this type. The vanes 26—26 may be of any suitable dimension in the direction of the axis of the cylindrical rotor 18, and in the circumferential direction may be relatively thick as shown for one of the vanes in Fig. 3; and through the vane, radially of the rotor, and through the corresponding head 25, a passageway 30 may be provided through which the volatile material may be injected into the bellows 23; and the passageway 30 may be sealed outwardly thereof in the usual manner by a plug device 71.

When the pump is installed as illustrated in the drawing and as will be understood, the water jacket portion 17 and the conduit portion 15 and pump chamber 14 are filled with the circulating liquid such as water, and the water may enter the pump rotor 18 through the perforations 28 and communicate the temperature thereof to the thermostatic bellows 23. When the water is cold as for example when the engine is first started up, the temperature thereof will be sufficiently low to contract the bellows 23 and withdraw the vanes 26 inwardly through their perforations 27—27 until the outer ends thereof are substantially flush with the outer cylindrical surface of the wall 19 of the rotor, this position being indicated by the broken lines at 31—31. Thus the rotating rotor effects no pumping action on the liquid.

If it be desired to have a very small rate of circulation occur during the warming up of the engine, to draw the heated water from the engine jacket into the pump rotor to communicate the same to the thermostat 23, the small perforations 29 may be provided. The rotation of the rotor then will throw water that is within the cylindrical rotor 18 outwardly through the perforation 29 by centrifugal force, drawing liquid inwardly through the perforations 28 and thus set up a low rate of circulation.

When the temperature of the water has risen sufficiently above the predetermined low value, the bellows 23 will expand and project the vanes 26—26 outwardly through the perforations 27, causing them to project radially beyond the wall 19 and to exert pumping action. As the temperature increases and the thermostat expands still farther, the vanes 26 will be projected farther outwardly, reaching ultimately a maximum position indicated at 72 corresponding to the said maximum predetermined temperature and causing the pump to effect the maximum pumping action and produce the maximum rate of circulation flow.

If at any time during the operation of the engine the temperature of the circulating liquid should fall below the desired predetermined value, the thermostat 23 will be contracted thereby and correspondingly withdraw the vanes 26 to a position corresponding to said reduced temperature to reduce the pumping action thereof and to permit the temperature to rise again to the predetermined value.

Any suitable support for the rotor 18 above described by which it may be rotatably driven may be provided. In the preferred form illustrated in Fig. 2 I provide a shaft 32 disposed coaxial of the cylindrical rotor 18 threaded at one end as at 33 into a head 34 having a transverse flange 35 secured as by rivets 36 upon the end wall 21 of the rotor. A bearing housing 37 extends from the pump housing 13 and is provided with a pair of axially aligned bearing bores 38 and 39 in which the telescoped bearing bushings 40—40 to rotatably support the shaft 32.

The bearing housing 37 is provided preferably with a thrust bearing face 41 and a thrust bearing washer 42, preferably of fiber or like material, surrounds the shaft 32 or a cylindrical portion of the head 34 thereof and has flat bearing engagement with the face 41 and the flange 35 whereby bearing is provided for end thrust of the shaft and rotor toward the right as viewed in Fig. 2.

The housing 37 may be provided intermediate of the bearing bushings 40—40 with a lubricant reservoir 43 for supplying lubricant to the bearings above referred to.

A belt pulley having a V groove 45 has a hub 46 thereon terminating in a hub sleeve 47 bored as at 48 to fit the outer end of the shaft 32. The hub sleeve 47 is fitted on to the end of the shaft and a pin 49 driven through aligned perforations in the hub sleeve 47 and shaft 32 to rigidly secure the pulley on the shaft, and the fit in the bore 48 may be water-tight whereby water or lubricant which may leak outwardly along the shaft 32 may be prevented from leaking out through the bore 48.

The bearing housing 37 terminates outwardly in a bearing face 50 and the pulley hub 46 has an inner bearing face 51, and a washer 52 is interposed between the faces 50 and 51 to provide an end thrust bearing for thrust toward the left as viewed in Fig. 2.

A sheet metal cup 53 has the skirt thereof pressed into a bored recess 54 in the pulley hub 46. The cup bottom is perforated as at 55 to encircle a cylindrical portion 56 of the bearing housing. A compressible packing ring 57 sealingly surrounds the cylindrical portion 56 and sealingly engages the bottom 58 of the cup 53. An annulus 59, angular in cross-section, forms a seat for the sealing ring 57, and a compression spring 60 abuts upon the annulus 59 and upon an opposite shoulder portion of the housing to compress the ring 57 upon the cup bottom and upon the cylindrical portion 56.

The ring 57 and the associated parts just described provide a seal for preventing lubricant or water which may leak outwardly along the shaft and outwardly radially over the bearing faces 50 and 51 from escaping.

By the construction just described, the shaft 32 may be rotated by the pulley 45 and the cylindrical rotor 18 secured to the shaft may be rotated on its cylinder axis to effect the thermally responsive pumping action above described. Shifting axially of the rotor 18 is prevented by the end thrust bearings above described.

From the foregoing description it will be clear that although the pump rotor 18 is continuously rotated, substantially no power is consumed thereby when the pumping section is stopped by withdrawal of the vanes 26, due to the cylindrical form of the rotor 18. If desired, the head 21 may be extended radially as at 61 beyond the cylindrical wall 19 to aid in directing the liquid into the conduit portion 15. Lubricant may be supplied to the lubricant reservoir 43 by a grease gun nipple 62 of suitable known construction and access thereto may be had through a perforation 63 at the bottom of the groove 45 of the pulley.

A compression spring 65 may be provided within the bellows 23 abutting at opposite ends upon the heads 20 and 21 and preferably under some initial tension when the bellows is in its most expanded condition whereby in the event that the bellows may become punctured and leak and its thermostatic action destroyed, the spring may expand the bellows to project the vanes 26 outwardly to insure circulation of liquid through the cooling system.

My invention is not limited to the exact details of construction shown and described. Changes and modifications may be made within the spirit of my invention without sacrificing its advantages and without departing from the scope of the appended claims.

I claim:

1. In a pump for circulating liquid through the cooling system of an internal combustion engine, a pump rotor comprising a head and centrifugal pump vane means movable radially on the head to different pumping positions to vary the pumping effect of the rotor from substantially zero to a predetermined maximum, and means thermally responsive to changes of pumped liquid temperature for adjustably moving the vane means.

2. In a pump for circulating liquid through the cooling system of an internal combustion engine, a pump chamber, a centrifugal type rotor rotatably supported in the chamber and comprising a head and a pump vane element rotatable therewith having pumping portions movable generally inwardly to substantially a non-pumping position and outwardly radially to vary the pumping effect thereof, and means for variably moving the vane pumping portions, thermally responsive to changes of temperature of the pumped liquid to correspondingly vary the pumping effect from substantially zero to maximum.

3. In a liquid pump for circulating liquid through the cooling system of an internal combustion engine, a pump chamber and a rotor rotatably supported therein comprising a head and a pumping element for exerting centrifugal force on the liquid in the chamber, the pumping element having a portion movable variably generally radially outwardly to vary the exerted centrifugal force and retractible substantially into the head, and means for variably moving the said portion, thermally responsive to temperature changes of the liquid in the chamber to correspondingly vary the pumping effect from maximum substantially to zero.

4. In a pump of the class described, a pump chamber, a rotor rotatably supported in the chamber, comprising a head and a vane having a portion generally outwardly radially movable from the head to vary the pumping action and inwardly movable to a position substantially flush with the head and a thermostat on the rotor for moving the vane portion in response to changes of pumped liquid temperature.

5. In a pump of the class described, a pump chamber, a rotor rotatably supported in the chamber, comprising a hollow generally cylindrical head, a vane having a pumping portion extending outwardly through the cylindrical wall of the head and movable generally radially to vary the pumping action thereof, and a thermostat in the hollow head connected to the vane to move it responsive to changes of temperature of pumped liquid.

6. In a pump of the class described, a pump chamber, a rotor rotatably supported in the chamber, comprising a frame having an outer generally cylindrical wall substantially coaxial with the rotor rotational axis, a vane element projecting through the wall, a thermostat subjected to temperature changes of liquid in the pump chamber and adapted to move the vane element inwardly and outwardly in response to changes of liquid temperature to vary the pumping action of the rotor.

7. In a pump of the class described, a pump chamber, a rotor rotatably supported in the chamber, comprising a hollow generally cylindrical rotor head, a pair of vane elements extending through opposite wall portions of the head, a thermostat of the bellows type supported in the head and connected to the vane elements adapted to project the vanes outwardly and withdraw them inwardly responsive to changes of temperature of the pumped liquid in the chamber, and means for communicating temperature of liquid in the chamber to the thermostat.

8. In a pump of the class described, a pump chamber, a rotor rotatably supported in the chamber, comprising a hollow generally cylindrical rotor head, a pair of vane elements extending through opposite wall portions of the head, a thermostat of the bellows type supported in the head and connected to the vane elements adapted to project the vanes outwardly and withdraw them inwardly responsive to changes of temperature of the pumped liquid in the chamber, means for communicating temperature of liquid in the chamber to the thermostat, and a spring within the bellows tending to expand it.

9. In a liquid pump for circulating a liquid through a conduit system, a pump chamber and a rotor rotatively supported therein comprising a hollow head provided with a pumping element for moving liquid through the chamber, the pumping element having a portion variably movable outwardly radially from the head to vary the liquid moving action, and variably retractible into the head and means for adjustably moving the said portion, thermally responsive to temperature changes of the liquid in the chamber.

10. In a liquid pump for circulating a liquid through a conduit system, a pump chamber and a rotor rotatively supported therein comprising a hollow head provided with a pumping element for moving liquid through the chamber, the pumping element having a portion variably movable generally outwardly radially from the head to vary the liquid moving action and variably retractible substantially into the head, and means for adjustably moving said portion comprising a thermostat substantially in the head thermally responsive to temperature changes of liquid in the chamber.

11. In a liquid pump for circulating a liquid through a conduit system, a pump chamber and a rotor rotatively supported therein comprising a hollow head provided with a pumping element for moving liquid through the chamber, the pumping element having a portion variably movable generally outwardly radially from the head to vary the liquid moving action and variably retractible substantially into the head, and means for adjustably moving said portion comprising a bellows type thermostat substantially within the head thermally responsive to temperature changes of liquid in the chamber.

12. In a pump for circulating liquid through a conduit system, a pump chamber, a centrifugal pump rotor rotatably supported in the chamber having centrifugal pumping elements movable radially to vary the pumping effect and means for variably moving the pumping elements thermally responsive to temperature changes of liquid in the chamber.

EDWARD L. MAYO.